No. 852,220. PATENTED APR. 30, 1907.
T. L. CECIL.
CLAMP FOR BASIN COCKS.
APPLICATION FILED FEB. 28, 1906.
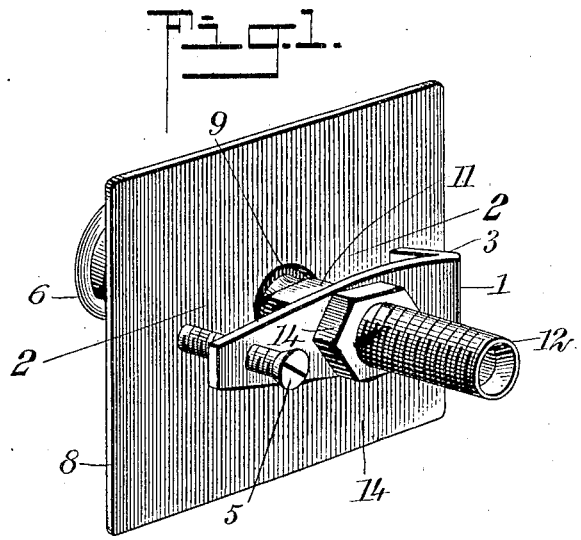
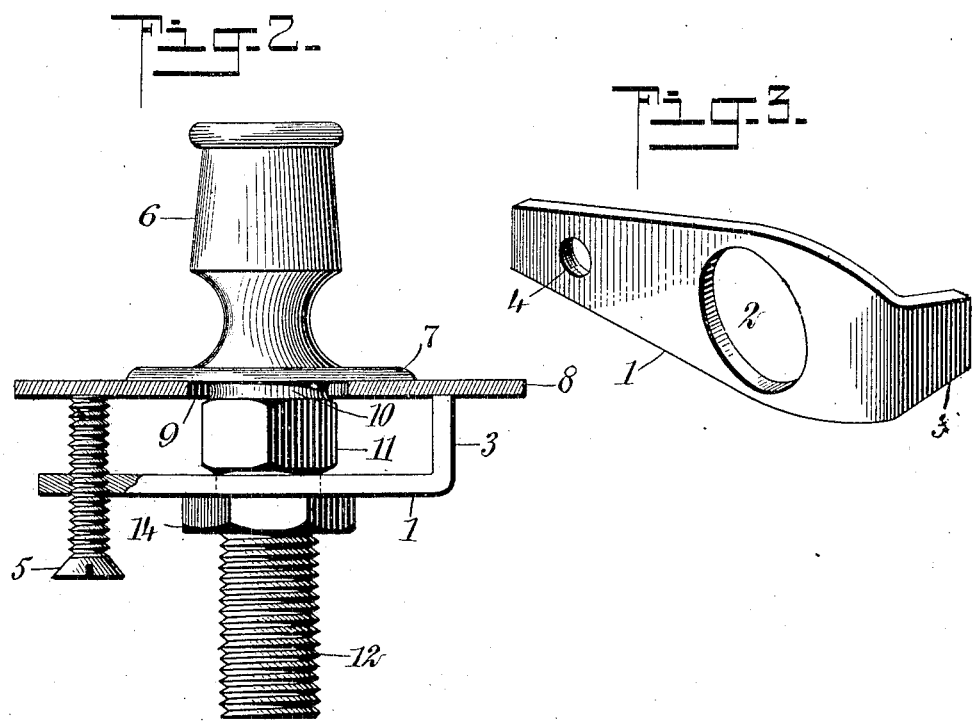
WITNESSES:
INVENTOR
Thomas L. Cecil
BY
ATTORNEYS

UNITED STATES PATENT OFFICE.

THOMAS L. CECIL, OF COLDWATER, MICHIGAN.

CLAMP FOR BASIN-COCKS.

No. 852,220.　　　　Specification of Letters Patent.　　　　Patented April 30, 1907.

Application filed February 28, 1906. Serial No. 303,364.

*To all whom it may concern:*

Be it known that I, THOMAS L. CECIL, a citizen of the United States, and a resident of Coldwater, in the county of Branch and State of Michigan, have invented a new and Improved Clamp for Basin-Cocks, of which the following is a full, clear, and exact description.

This invention is an improvement in clamps for basin cocks or faucets and has for an object, among others, to provide an efficient and simple locking means to positively prevent the cock from becoming detached from the basin, yet to allow the ready removal of the cock, if desired, without difficulty.

Ordinarily, cocks or faucets are fastened to the slab of the basin by means of lock nuts which become set or rusted and can be removed only by much labor when it is necessary to disassemble them. With the present device it is only necessary to run the outer nut up on the threaded shank of the faucet with the fingers until it brings the inturned leg of the clamping plate in contact with the slab or other means to which the cock is to be fastened; then by a few turns of the set-screw in the end of the clamping plate with a screw-driver, the cock is securely locked in position.

For a more detailed and extended description reference is to be had to the accompanying drawings wherein like reference characters designate the same parts throughout all the views, and in which Figure 1 is a perspective view of the device when employed in locking a faucet to a plate or slab; Fig. 2 is a plan view, partly in section, substantially on the line 2—2 of Fig. 1, and Fig. 3 is a perspective view of the clamping plate when detached from the rest of the structure.

The numeral 1 designates a locking plate provided with an intermediate opening 2, a down-turned fulcrum leg 3 and a small threaded opening 4. Into this latter passes a set-screw 5, whose threads engage the threads of the opening 4.

6 is a cock or faucet having a large flange 7 at its base for engagement with a slab or plate 8, the latter having an opening 9 through which passes the shank 10 of the faucet. The said shank is provided with a hexagonal extension or other polygonal shaped extension 11 and a screw threaded pipe portion 12. The part 11 serves to prevent the faucet from turning when held by means of a wrench or other like mechanical device. Upon the threaded portion 12 I provide a resistance nut 14 for bringing the spring clamping plate 1 to position and overcoming the resistance of the screw 5 through the plate 1, which latter normally tends to force the nut outwardly, binding the threads of the nut 14 and shank 12 together, and hence preventing them from becoming unscrewed, and holding the faucet securely in place when the screw 5 is tightened against the plate 8.

In removing the faucet, it is only necessary to loosen the set-screw 5, which permits removal of the nut 14 with the fingers and consequently the ready removal of the faucet.

An important feature of the spring plate 1 is its shape which, as shown, is widest at the central aperture 2 and tapering at both ends, forming substantially counterparts of each other, which conformation affords the greatest strength obtainable with the least amount of metal employed in its manufacture.

Having thus described my invention I claim as new and desire to secure by Letters Patent:

1. In a device of the class described, the combination of a faucet provided with a flange, a screw-threaded shank and an intermediate polygonal portion, a slab provided with an aperture through which the shank passes, a spring plate having a central aperture in engagement with the shank and tapered arms extending radially therefrom carrying, respectively, a fulcrum leg and a set-screw, and a resistance nut on the shank, whereby when the set-screw is tightened, the spring plate will draw the flange against the slab and bind the threads of the nut and shank.

2. In a device of the class described, a spring-clamping or locking plate having an adjustable element, a faucet having a shank, and means on the shank, co-acting with the plate, for locking the faucet in position.

3. The combination with a faucet provided with a shank, a spring-clamping or locking plate having a central aperture in engagement with the shank, a fulcrum leg, and a set-screw extending from and carried by the locking plate, and means at each side of the plate co-acting with the screw, for locking the faucet in position.

4. A locking device for faucets and the like, comprising a spring plate having an enlarged apertured middle portion, and a tapered extension or wing at each side of the middle portion, one of said extensions being provided with an inturned leg and the other with a threaded aperture.

5. In a clamping device for faucets, a faucet having a base flange in engagement with a slab, a threaded pipe shank extending therebeyond and through an aperture in the slab, an intermediate polygonal portion, an apertured plate inclosing the polygonal portion between itself and the slab, a nut threaded upon the shank, and means carried by the plate engaging the slab at each side of the shank for locking the faucet in position.

In testimony whereof I have signed my name to this specification in the presence of two subscribing witnesses.

THOMAS L. CECIL.

Witnesses:
CHAS. F. CARPENTER,
W. E. HODGMAN.